UNITED STATES PATENT OFFICE.

EDWARD P. SMITH, OF CHATTANOOGA, TENNESSEE, ASSIGNOR OF TWO-THIRDS TO MARK L. MORRISON AND GEORGE SCHINDLER, OF CHATTANOOGA, TENNESSEE.

PROCESS OF MAKING COMPOSITION OF MATTER.

SPECIFICATION forming part of Letters Patent No. 726,582, dated April 28, 1903.

Application filed September 13, 1902. Serial No. 123,293. (No specimens.)

*To all whom it may concern:*

Be it known that I, EDWARD P. SMITH, a citizen of the United States, residing at Chattanooga, in the county of Hamilton and State of Tennessee, have invented certain new and useful Improvements in Processes of Making a Composition of Matter; and I do hereby declare the following to be a full, clear, and exact description of the invention, such as will enable others skilled in the art to which it appertains to make and use the same.

My invention relates to a process for producing a new substance designed particularly as a substitute for cork and cork-wood in all the uses to which the latter may be put. This substance is the equal in all respects of cork and cork-wood; but it is superior in that it may be employed, owing to its cheapness, in many articles of manufacture wherein the cork itself would not serve or would be too expensive for commercial use. The cheapness of this composition compared to cork and cork-wood will produce the natural result of its competing in all lines in which cork is a factor. Bottle-stoppers, boots and shoes, &c., are merely instances of the wide and well-known uses of cork and cork-wood, and consequently hint at the wide range of utility of this novel substitute for the same which I have invented.

The composition in general is a result of treating wood-pulp or other ligneous substances with certain elements. The success, however, of my composition is due to the proper mixing and manipulation of the particular elements constituting the same, which elements are wood-pulp, cornstalk-pith, gelatin, glycerin, and formaldehyde. The proportion, by volume, in which these elements are combined and from which are gained the most satisfactory results is as follows: three parts of wood-pulp, one part of cornstalk-pith, a solution of one part of gelatin, one of glycerin, and four or five of water, and a solution of formaldehyde in water, one part to five; but my process is not limited in all its steps to the employment of these specific ingredients nor to the exact proportions thereof enumerated.

The method of producing my composition from the above ingredients comprises the following steps: After thoroughly disintegrating the ligneous substances to be used and while the same are in a moist warm condition they are mixed with the solution of gelatin, glycerin, and water above described. At this stage the whole mass is thoroughly stirred, so as to obtain an as perfectly commingled and homogeneous a mixture as possible. While the product of the last-named step is still warm the superfluous or excess moisture is extracted in any well-known manner and the substance is then, as the last step in the process, allowed to coagulate with the above-described solution of formaldehyde. The formaldehyde also renders the product insoluble to most liquids. It is in this last step that great care has to be exercised to secure the successful production of my composition; but upon the completion of this step the substance is then subjected to pressure while congealing either by immediate molding into the form desired or may be pressed into a mass to be afterward made up into a finished product composed of my novel substitute for cork and cork-wood.

The foregoing is a description of my product and the method for producing the same; but I do not wish to be narrowly limited to the ingredients and proportions set forth, as slight changes may be introduced in both without materially affecting the nature of my substance.

What I claim, and desire to obtain by Letters Patent, is—

1. The process of making a composition of matter consisting of disintegrating a ligneous substance, mixing the same with gelatin and glycerin, and then introducing into the mixture a suitable coagulant, substantially as described.

2. The process of making a composition of matter consisting of disintegrating a ligneous substance, mixing the same with glycerin and gelatin, and then coagulating the mixture by the introduction of formaldehyde, substantially as described.

3. The process of making a composition of matter consisting of disintegrating a ligneous substance, mixing the same while warm with gelatin and glycerin, expelling the excess of moisture from said mixture, and while the mixture is warm, coagulating the same, substantially as described.

4. The process of making a composition of matter consisting of disintegrating a ligneous substance, mixing the same while warm with gelatin and glycerin, expelling the excess of moisture from said mixture, and while the mixture is warm, introducing formaldehyde to coagulate the mixture, substantially as described.

5. The process of making a composition of matter consisting of mixing warm wood-pulp and cornstalk-pith with gelatin and glycerin, removing the excess moisture, and coagulating said mixture with formaldehyde, substantially as described.

6. The method of producing a composition of matter consisting of disintegrating and mixing wood-pulp and cornstalk-pith, then adding to this mixture while still moist a solution of gelatin, glycerin and water, and mixing the same therewith while warm, then removing excess of moisture and while still warm coagulating the mixture with a solution of formaldehyde and water, substantially as described.

7. The method of producing a composition of matter consisting of disintegrating and mixing wood-pulp and cornstalk-pith, then adding to this mixture while still moist a solution of gelatin, glycerin and water, and mixing the same therewith while warm, then removing excess of moisture and while still warm coagulating the mixture with a solution of formaldehyde and water, and then subjecting the resulting mixture to pressure, substantially as described.

In testimony whereof I affix my signature in presence of two witnesses.

EDWARD P. SMITH.

Witnesses:
T. G. NEWMAN,
W. W. BROOKS.